United States Patent [19]

Luginbühl

[11] Patent Number: 4,483,362

[45] Date of Patent: Nov. 20, 1984

[54] DEVICE FOR SUPPLYING MOVABLE USERS WITH A PRESSURE FLUID

[76] Inventor: Rolf W. Luginbühl, Florastrasse 5, Küsnacht 8700, Switzerland

[21] Appl. No.: 373,513

[22] Filed: Apr. 30, 1982

[30] Foreign Application Priority Data

Mar. 19, 1982 [EP] European Pat. Off. ........ 82102241.5

[51] Int. Cl.³ ......................... F16L 29/00; F16L 37/28
[52] U.S. Cl. .................................... 137/322; 137/580;
222/505; 239/569; 239/711; 251/149;
251/149.8
[58] Field of Search ....................... 137/315, 322, 580;
222/507, 509, 505; 239/569, 711; 251/65, 149,
253, 309, 310, 149.8, 149.9

[56] References Cited

U.S. PATENT DOCUMENTS

| | | | |
|---|---|---|---|
| 695,697 | 3/1902 | O'Lally | 251/253 |
| 951,519 | 3/1910 | Bacigalupi | 137/322 |
| 1,755,536 | 4/1930 | Chase | 251/325 |
| 2,099,992 | 11/1937 | Sutcliffe | 251/325 |
| 2,170,619 | 8/1939 | Sica | 251/310 |
| 3,195,562 | 7/1965 | Nelson et al. | 137/322 |
| 3,580,401 | 5/1971 | Stahl | 137/580 |
| 4,296,774 | 10/1981 | Kagi et al. | 137/322 |
| 4,375,822 | 3/1983 | Kagi et al. | 137/322 |

FOREIGN PATENT DOCUMENTS 1501091  2/1978  United Kingdom .

*Primary Examiner*—George L. Walton
*Attorney, Agent, or Firm*—Yount & Tarolli

[57] ABSTRACT

An apparatus for supplying fluid under pressure, such as compressed air, to movable using devices, includes a feed line having tap points spaced along it, with a tap valve at each tap point. A connection unit for connecting the feed line to the user is movable along the feed line and can receive fluid at any tap point. As the connection unit slides into place at the tap point, the tap valve automatically opens to supply fluid. Each valve has a rotary or slide-type valve member movable between open and closed positions, which is always exposed to equal fluid pressure all about it so as to require only a small force to actuate the valve. The valve member is tubular and open-ended and extends parallel to the feed line. Both mechanical and magnetic means for actuating the valve member are disclosed.

10 Claims, 6 Drawing Figures

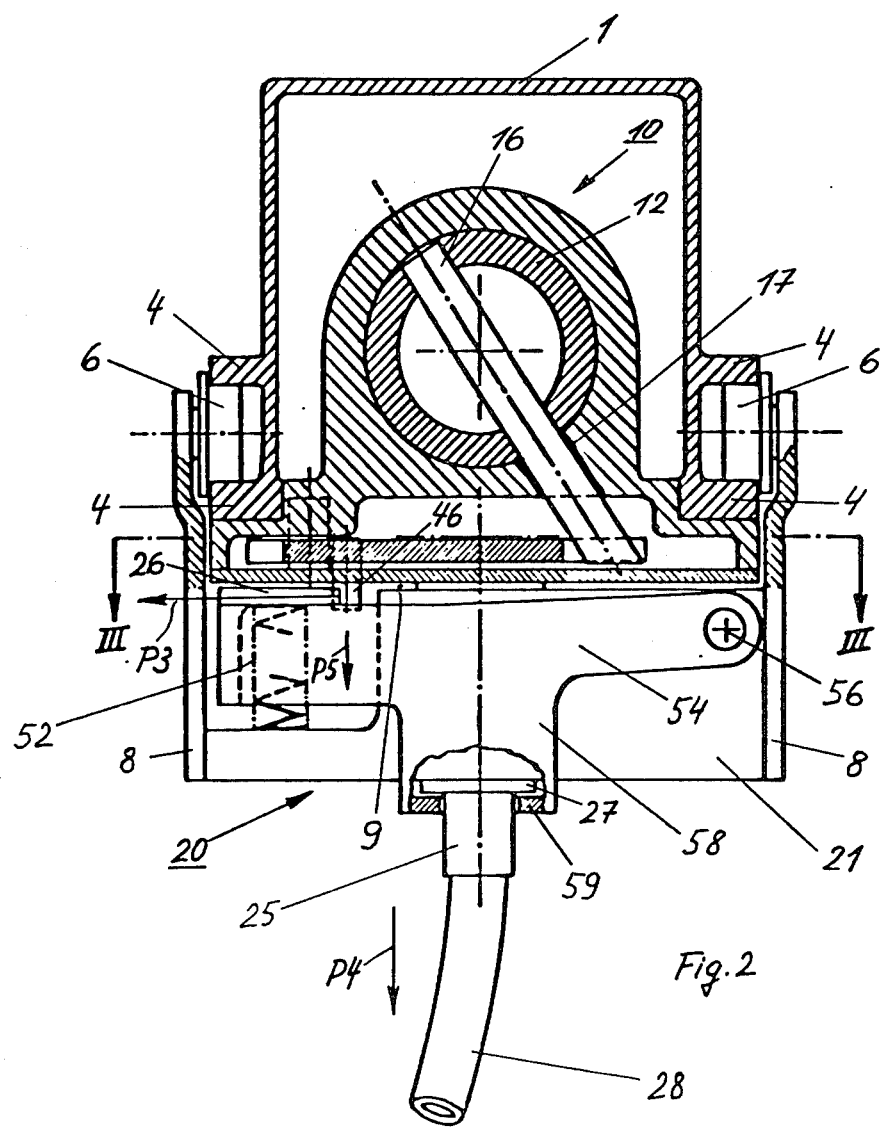

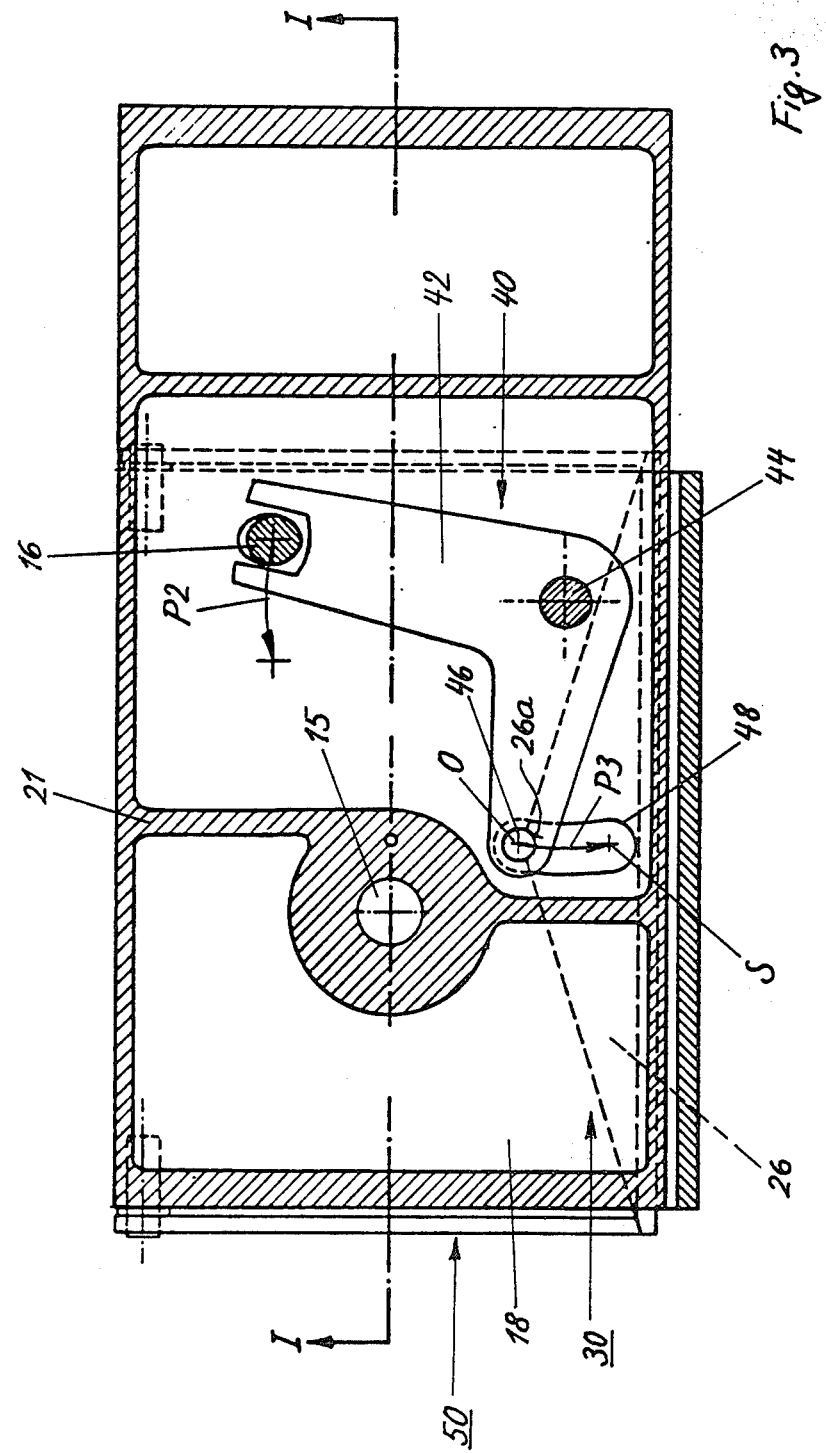

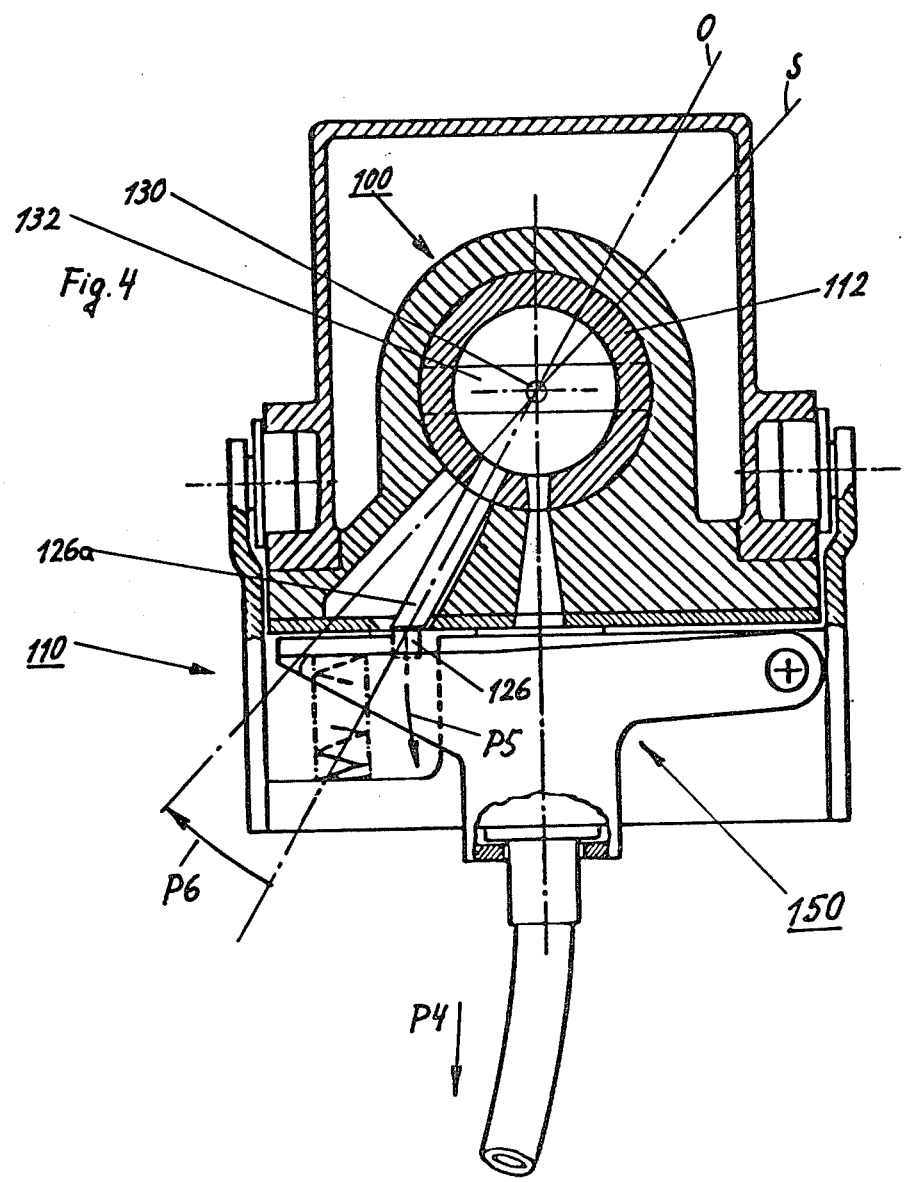

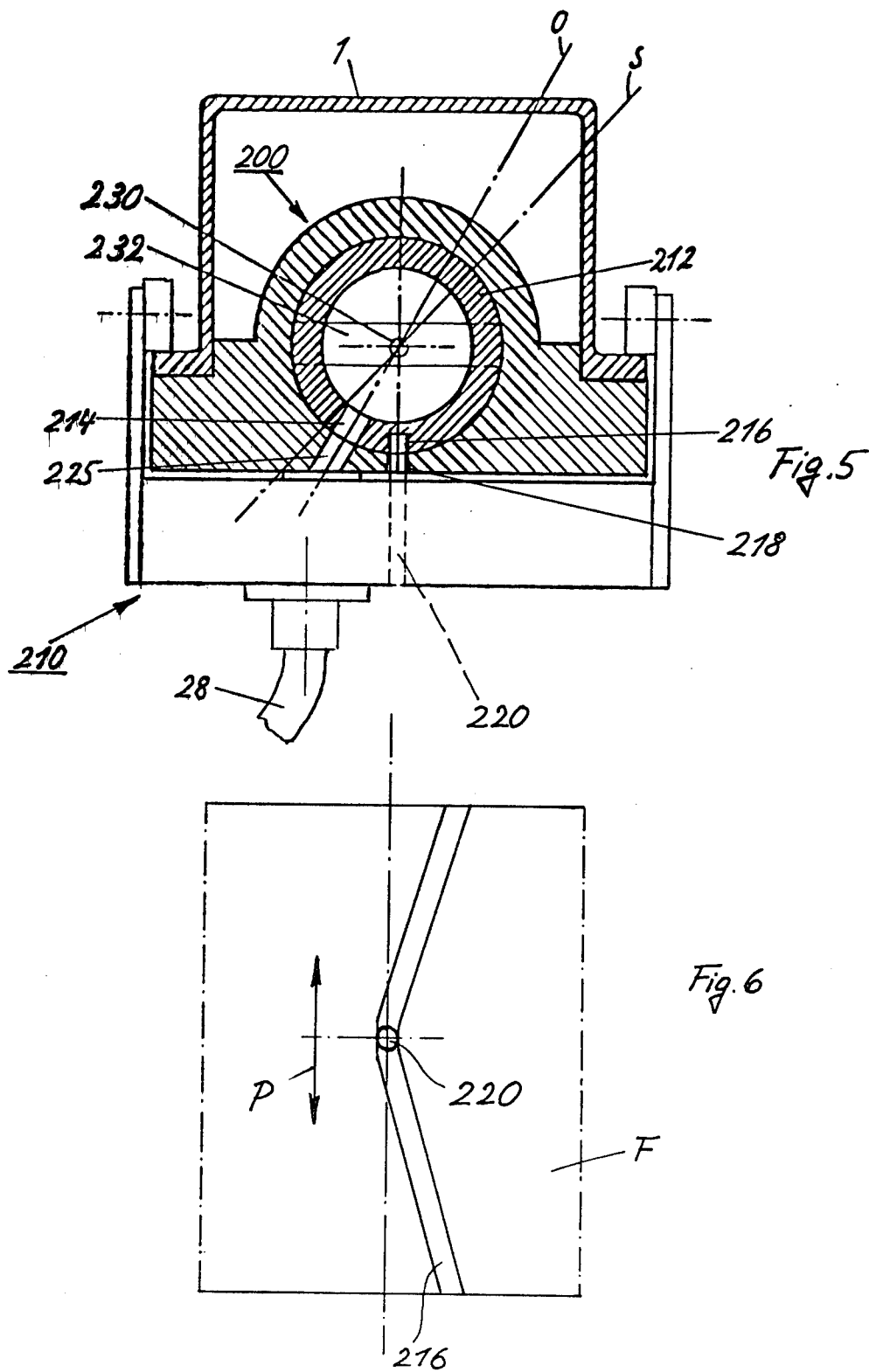

DEVICE FOR SUPPLYING MOVABLE USERS WITH A PRESSURE FLUID

BACKGROUND OF THE INVENTION

The invention concerns a device for supplying of movable users with a pressure fluid, with a supplying feed line which has a plurality of tap points arranged mutually distanced over the length of the line, and having at least one connection unit supported movable along the feed line for a respective tap line, the tap points having at least one tap valve, convertible from a closed to an open position by moving the connection into a connecting position, and sealing means being provided, in the zone of the connection unit between tap valve and tap line entrance, becoming automatically active with the opening of the tap valve, for the outer sealing of the connection unit. Such devices are used, for example, in the form of more or less extended compressed air or compressed water tap systems, for the selective movable supplying of movable tool machines or transportation devices.

A device of the above-mentioned kind is known, for example, from U.S. Pat. No. 3,195,562. There, lift valves are provided at the individual tap points, which are held in the closed position under the action of the pressure fluid. The connection unit, set at a tap point, must therefore be brought into its open position by means of an actuating member which is under a relatively strong opening pressure force, sufficient to overcome the closing force of the valve. This opening pressure force is built up, there, by the compression of a spring by means of an inclined run-up track with movement of the connection unit into the tap or connecting position, and upon catching in the connection position, spring force is transmitted directly to the lift valve member, which is under the pressure fluid effect in the feed line. The actuating force necessary for opening, and thus the resistance to be overcome in bringing the connection unit into the tap position, are necessarily relatively great, which makes handling difficult.

Another known tap device of the kind mentioned is known from British Patent No. 1,501,091. There, the tap valves are also designed as lift valves, held in the closed position under the pressure of the fluid in the feed line, which are opened by means of complicated and expensive conversion gears to intensify the actuating force of opening and with the aid of a motor drive assembly for the moving of the connection unit to the tap point.

SUMMARY OF THE INVENTION

The problem of the invention, therefore, is to provide a tap point fluid supplying device of the kind mentioned which is distinguished by simple and robust structure and by correspondingly low-wear operation with longer, trouble-free life and by lower production cost, with easier and simpler operation, especially in manual operation for the moving of the connection unit. The solution of this problem, according to the invention, is distinguished, in a supplying device of the kind mentioned, by the fact that the tap valves are provided with valve members at least approximately relieved of pressure from the pressure fluid in the feed line.

The pressure-relieved valve member provided, according to this, can be held in the closed position by relatively weak forces, for example, a weak spring pretension, or, in principle, supported stable in position, indifferent to the action of the pressure fluid, and converted to the closed position in each case by the connection unit leaving the tap point. In any case, only very slight forces are needed for the opening of the tap valve, which forces can be easily applied by moving the connection unit, by hand, into the connection point. Preferably, automatically-acting seal means, necessary in any case, are provided for the outer sealing of the connection point after opening the tap valve and also for stopping in position of the connection unit in the connection or tap position.

Such automatically-acting sealing and stopping means for a tap supplying device of this generic kind are known from German Disclosure No. 2,933,056.

The lifting of such automatic sealing means, with removal of the connection unit, with the use of a pressure-relieved push valve of the present kind, can also be obtained by means of simple added control channels with low actuation or pushing force, and generally, moreover, without complicated servo valve arrangements. One preferred form of execution of the invention is distinguished by the fact that the tap valves each have a cylindrical or prismatic push-valve member, impacted at both its end surfaces by the pressure fluid. The use of such a push valve member, supported movable, in particular, parallel to the lengthwise direction of the feed line, between open and closed position, and which consequently can be placed with a suitable insert within the feed line itself, permits, in a very simple way and with very low production expense, a practically complete relief from pressure, with correspondingly low closing pretension forces and opening actuation forces. Moreover, the sealing of the valve member is simple and reliable, namely with the aid of ordinary sealing rings, surrounding continuously the circumference of the valve body.

Another advantageous further development of the invention provides, for the tap valves, cylindrical rotary valve members, which can be arranged, in turn, especially with their cylindrical axes parallel to the lengthwise direction of the feed line and which go into active connection with a swinging actuating member of the connection unit. Such a design offers in particular the advantage of relatively low valve actuating distance with a given flow cross section and also the advantage of lower outside actuating forces, because of the lever conversion of actuating force, given in general by the rotatable support of the valve member.

BRIEF DESCRIPTION OF THE DRAWINGS

Other features and advantages will be explained from the examples of execution shown schematically in the drawings.

FIG. 2 is a graduated vertical cross section of the tap point with connection unit according to plane II—II in FIG. 1.

FIG. 3 is a horizontal section of the tap valve actuating device along plane III—III in FIG. 2.

FIG. 4 is a vertical cross section of another design of a tap point with connection unit in connecting position.

FIG. 5 is a vertical cross section of another design of a tap point.

FIG. 6 is a corresponding representation of development.

DESCRIPTION OF A PREFERRED EMBODIMENT

Figure 1:
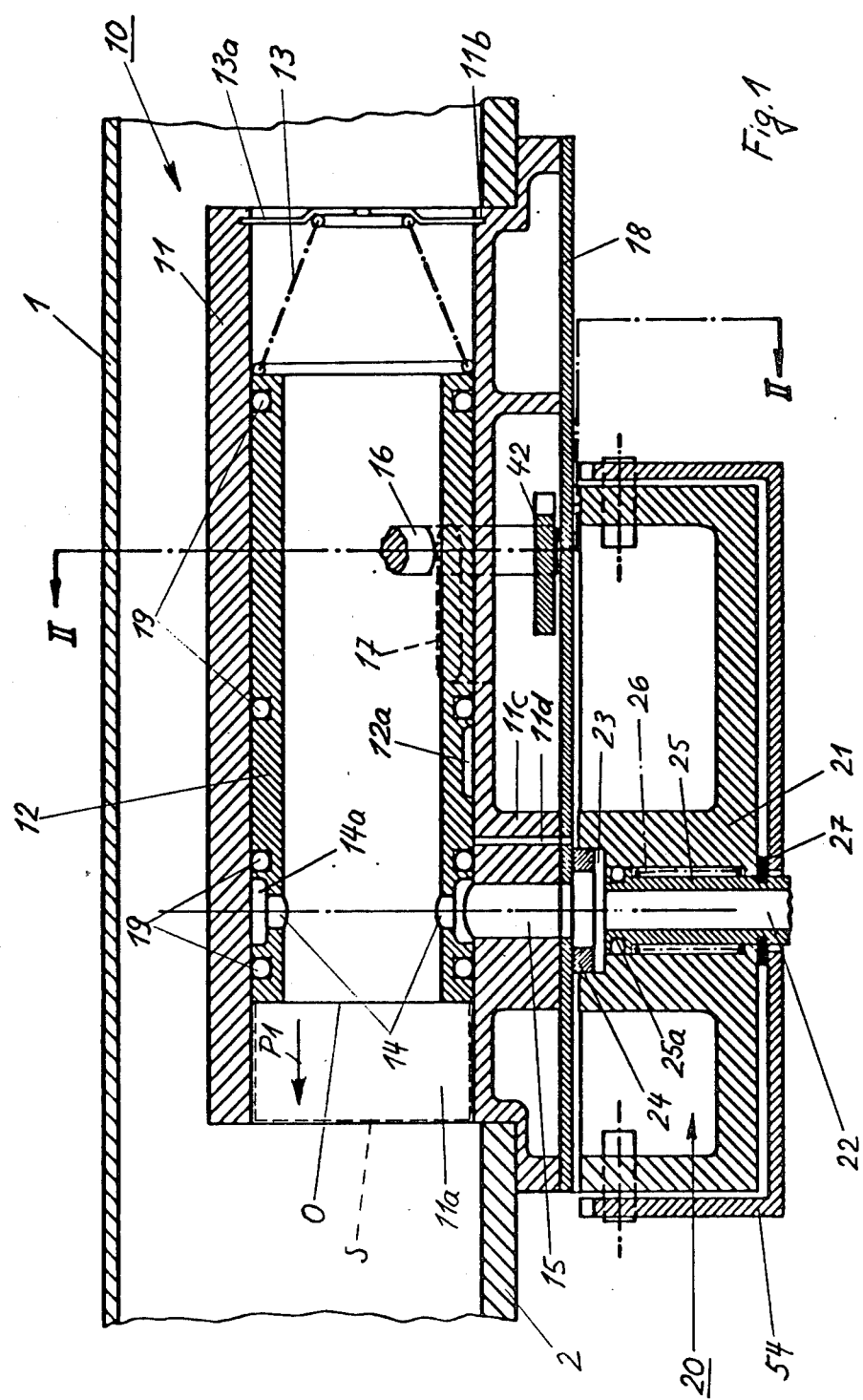
FIG. 1 shows a vertical axial section of a tap point with connection unit in connecting position, along the plane I—I in FIG. 3.

The pressure fluid supplying device, shown in FIGS. 1 to 3, includes a hollow-profile feed line 1, set into the reinforced bottom plate 2, and tap valve 10, placed mainly in the inner space of the feed line. Guide ribs 4, formed on both cross section sides of the feed line 1, extending parallel with each other, receive in their vertical interspace carrying and guiding rolls 6, which are supported in the upper sections of side bearing plates 8, extending vertically. Between the lower sections of these bearing plates is fastened a connection unit 20 which is thus guided, during the approach and leaving movement in the zone of the tap point, on its upper side, at a constant slight gap distance 9 from the under side of the tap valve 10, parallel to the lengthwise direction of the feed line 1.

The tap valve 10 includes a housing 11, extending into the inner space of the feed line 1, with a cylindrical passage bore 11a, extending parallel with the longitudinal axis of the feed line, in which is supported a cylindrical tubular push valve member 12, movable between the open position O, shown in solid lines, and the closed position S, shown partly in broken lines. A conical compression spring 13 is supported, on its one end, against a two-part bearing disc 13a, set into an inner circumferential groove 11b, and on its other end, against the right end surface of the push valve member 12, so that the latter is under pretension (prestress) in the direction against its open position. This spring pretension has to overcome only the friction between push valve member 12 and the passage bore 11a, as well as friction forces within the actuating gear, in the return movement, and correspondingly, needs to apply only slight mass acceleration forces.

Within the tubular push valve member 12 are formed several flow passage channels 14 as well as a collection groove 14a, receiving these latter and extending over the outer circumference of the push valve member. The latter comes to coincide, in the open position O, with an outflow channel 15 in the reinforced bottom section 11c of the housing 11, which in turn, in the open position of the connection unit 20 according to FIG. 1, is in passage connection with an entrance opening 22, formed in the base body 21 of the connection unit, of a flexible tap line 25 connected with the connection unit. The under side of the housing 11 is smoothly covered by a thin plate 18 which is perforated by the outflow channel 15.

The tubular push valve member 12 is impacted on both its end surfaces by the pressure fluid in the inner space of the feed line 1, and is thus pressure-relieved of the coresponding forces, and therefore is movable free of force (aside from the prestress of the compression spring 13 and the slight friction forces as a result of the sealing rings 19 surrounding the cylinder circumference of the valve body). The connection unit 20 includes a two-part wedge-shaped swinging actuating member 26, extending lengthwise of the feed line 1 and in the direction of movement of the connection unit, with a catch opening 26a arranged in its peak zone. This actuating member forms, together with a control pin 46 of a direction-changing gear 40, a cam gear (marked 30, as a whole), which converts the lengthwise movement of the connection unit 20 into a valve actuating movement directed transversal to the lengthwise movement. On coming into the connection position, the control pin 46 is thus pushed opposite the arrow direction P3, out of the rest or closing position S, into the open position O and stopped in the catch opening (notch) 26a. The control pin 46 sits on an angle lever 42, which is supported pivotally around a bearing pin 44 connected with the base body of the connection unit, and engages with a forked end section at the lower end of a setting pin 16, rigidly joined with the push valve member 12. The latter extends through a lengthwise slot 17 in the housing 11 and has end stops, on both sides, corresponding to the open and closed positions O and S, respectively, of the valve member 12. With this, the setting movement of the valve member is also limited at both sides. The return force of the compression spring 13 also holds the control pin 46 into the catch opening 26a, until the holding force of the catch is overcome by movement of the connection unit out of its connecting position and the control pin 46 returns in the arrow direction P3 into its rest or closed position S.

At the connection between the outflow channel 15 and the entrance opening 22 of the hose line 28, a sealing ring 24, supported axially movable in a pressure chamber 23 and sealing at its circumference, is pressed against the underside of the plate 18 of the tap valve 10. The connection is thus automatically sealed toward the outside, under the action of the pressure fluid.

The inlet opening 22 of the hose line 28 is formed by a socket 25, supported movably in the housing 11 and sealed against the pressure chamber 23 by means of a sealing ring 25a, which socket is held by a return spring 25b in an upper end position. A stop ring 27, joined with the socket, lies against the underside of the base body 21 of the connection unit.

The connection unit 20 is provided with a release device 50, which has a release lever 54 under the action of a relief spring 52 and which can swing around the horizontal pin 56. The lever bears, as shown in FIGS. 2 and 3, against the double wedge-shaped actuating member 26, which is thus supported movable vertically. Side arms 58, with a lengthwise support 59, extending under the base body 21 of the connection unit, are so connected with the release lever 54 that a vertical pull on the hose line 28, along arrow P4, allows the socket 25 and thus the stop ring 27 to act on the release lever 54 in the sense of a downward swing according to the arrow P5. With this, the actuating member 26 is moved downward according to the arrow P4 and frees the control pin 46 for its return movement according to the arrow P3 (FIG. 3). With this, also, the valve member 12 is freed for its return into the closing position S according to the arrow P1 (FIG. 1). The subsequent end of the pulling force on the hose line 28, allows the actuating member 26 to act against the underside of the control pin 46, but without influencing its closing position.

With the closing of the valve member 12, a relief overflow channel 12a comes into connection with an outlet channel 11d, so that the pressure chamber 23 is ventilated and the sealing ring 24 relieved. With this, the connetion unit is freed for a movement out of the connecting position. After removal of the connection unit, the actuation member 26 with the release lever 54 snaps back, under the action of the springs 25b and 52, upward into its action position for a new opening and stopping process.

The design according to FIG. 4 differs from the preceding by a valve member 112, designed to be rotatable, within a tap valve 100. A swinging actuating member 126a, designed as a radial pin and directly joined with the valve member, forms, together with a permanent magnet body 126, supported movable vertically according to arrow P5, a coupled pair of magnetic bodies in a magnetic flux, which moves the actuating member 126a, on arrival of the connection unit into the connecting position, against the action of a torsion return spring 120, from the closed position S into the open position O. This return spring is connnected, for this purpose, by a cross support 132 with the valve member 112 and (in a manner not shown) secure against rotation with the housing of the tap valve 100. By means of a swinging lever release device 150, which corresponds essentially to the preceding design, there is effected, with traction on the hose line according to the arrow P4 (but here much more strongly) a lowering of the permanent magnet body 126, thus effecting the valve opening. In this way, the magnetic coupling is so much weakened that the swinging actuating member 126a returns with the valve member into its closing position. A relief of traction on the hose line without removal of the connection unit 110 from the connecting position leads, in this case, however, contrary to the device described before, to a renewed opening of the valve.

A tap valve 200, shown in FIGS. 5 and 6, is provided with a tubular rotary valve member 212, as in the form of execution described before. In the open position O, indicated in FIG. 5, a radial control channel 214 of the rotary valve member 212 is aligned with an outflow channel 225 and passes, through this, into connection with the tap hose line 28 of a connection unit 210, movable as before. A torsion spring 230, like that provided in the design according to FIG. 4, is connected through a traverse 232 with the rotary valve member 212 and through an opposite member (not shown) with the housing of the tap valve 200, and sets the rotary valve member 212 under pretension in the direction of a return movement from the open position into the closed position S. For the rest, the opening and closing swinging movement of the rotary valve member is determined through the movement of a control pin 220 within the connecting unit 210 as a result of the movement of the connection unit lengthwise on the feed line 1, in combination with a control groove 216 within the outer circumferential surface of the rotary valve member 212. The control pin 220 extends through a lengthwise slot 218 made parallel with the lengthwise direction of the feed line 1 in the underside of the housing of the tap valve 200, and is thus guided independently of the movement support of the connection unit 210 exactly in the axial direction of the rotary valve member 212. The upper end section of the control pin 220 extends inward, in relation to the rotary valve member 212, into the control groove 216, from which is given, with the lengthwise movement of the connection unit 210 and thus of the control pin 220 in relation to the tap valve 200 and thus the control groove 216, the necessary swinging movement between the closed and open position and in the opposite direction, on reaching and leaving the connection position. FIG. 6 shows the corresponding oblique course of the control groove 216 in a development of the cylindrical outer circumferential surface of the rotary valve member 212.

It should be said, further, in connection with the different possibilities of execution of the release devices for the resetting of the valve member into its closed position:

In the design according to FIGS. 1 and 2, the push valve member 12, as explained, returns, after producing a corresponding traction force, according to arrow P4, on the hose line 28, into the closing position, while a subsequent release of the hose line without movement of the connection unit does not result in opening the tap valve again. When such a function is not desired, provision may be made directly within the idea of the invention, for the valve member to be converted reversibly into the closed position while maintaining the connection position. For this, in the design according to FIG. 2 (aside from other plausible constructive adaptations), the swinging axis 56 need only be turned far enough downward and possibly in the direction of the central axis of the connection unit 20, so that instead of the lowering movement of the double wedge-shaped actuating member 26 in the direction of the arrow P5, with which is associated the explained irreversible release of the control pin 46, there occurs directly a release movement of the actuating member 26, more or less parallel to the direction of movement of this control pin according to arrow P3. The relief spring, 52, for this purpose, must naturally be brought into the corresponding tangential direction in relation to the changed rotary axis position, so that again the desired relief effect and resetting force is given against the traction force impact of the hose line 28. This relief force of the spring, acting in the opening direction of the valve, may directly be made great enough so that it overcomes the force of the compression spring 13, acting directly on the valve member 12 in the closing direction of the valve. This has the result, then, that after relieving the hose line 28 of the release traction force according to the arrow P4, there is at once a renewed opening of the tap valve with automatic outer sealing of the tap connection.

For the rest, the connection, movable lengthwise, of the hose line 28 within the connection unit 20 can also be relieved by simple constructive means, as to the fluid pressure in the outflow channel and in the tap line itself. For this, in the design according to FIG. 1, for example, it is only necessary, essentially, to provide the socket 25, with the corresponding upper and lower sealing, with radial channels, which are connected with corresponding radial overflow channels from the pressure chamber 23 itself. The upper end of the socket 25 should be provided, for this purpose, with a seal, and introduced into a sack bore (hole with bottom), sealed off from the pressure chamber 23, so that no pressure fluid can act on the upper end surface of the socket 25. The corresponding sack bore space is to be provided, for this purpose, with a ventilation opening. With such a construction, the release actuating force becomes independent of the fluid pressure and its fluctuations.

I claim:

1. A device for supplying a fluid under pressure from a feed line having a plurality of tap points to at least one user at a selected one of said tap points, the tap points being spaced apart over the length of the feed line, the device comprising at least one connection unit for connecting the user to the feed line movable along the feed line for the purpose of selecting a tap point, at least one tap valve at one of said tap points, said tap valve including a valve member movable along said feed line between open and closed positions to control communication of fluid between said feed line and said connection unit, means for moving said valve member along the feed line between said closed and open positions in response to movement of said connection unit along said feed line into a connecting position corresponding to said one tap point, sealing means between said connection unit and said tap valve for providing a seal therebetween in response to opening of said tap valve, said valve member comprising a tubular valve member being disposed within said feed line and parallel thereto and having opposite end faces exposed in any operating position to one and the same fluid pressure and thus being substantially free of fluid pressure forces which might tend to bias said valve member into a closed position, said tubular valve member having an opening through the wall of said tubular valve member intermediate said end faces of said valve member for communicating fluid from said feed line to said connection unit when said valve member is in said open position.

2. A device according to claim 1, wherein said connection unit comprises cam gear means cooperating with valve actuating means on said valve for moving said valve member along said feed line upon engagement of said connection unit with said tap valve.

3. A device according to claim 1 comprising gear means cooperating with valve actuating means coupled with said push valve member through a direction-changing gear, for converting valve-actuating movement directed transverse to the direction of movement of said connection unit along said feed line, into valve-opening movement directed parallel with said direction of movement of said push valve member along said feed line.

4. A device according to claim 1, including valve actuating means including a linearly movable valve actuator connected to said valve member, and wherein said means for moving said valve member between said closed and open positions comprises operating means on said connecting unit for effecting movement of said valve actuating means upon movement of said connecting unit into and out of said connecting position at said tap point, and wherein said valve actuating means includes rocker means pivotally mounted on said valve and engageable at one end by said operating means and having means at an opposite end for engaging said valve actuator to provide movement of said valve member along said feed line between said closed and open positions.

5. A device for supplying a fluid under pressure from a feed line having a plurality of tap points to at least one user at a selected one of said tap points, the tap points being spaced apart over the length of the feed line, the device comprising at least one connection unit for connecting the user to the feed line movable along the feed line for the purpose of selecting a tap point, at least one tap valve at one end of said tap points, said tap valve including a rotary valve member being disposed within said feed line and being rotatable about an axis approximately parallel to the longitudinal extent of said feed line between open and closed positions to control communication of fluid between said feed line and said connection unit, means for rotating said rotary valve member between said closed and open positions in response to axial movement of said connection unit along said feed line into a connecting position corresponding to said one tap point, sealing means between said connection unit and said tap valve for providing a seal therebetween in response to the opening of said tap valve, said rotary valve member comprising a tubular open-ended rotary valve member having opposite end faces exposed to one and the same fluid pressure, said tubular open-ended rotary valve member having an opening through the wall of said tubular valve member intermediate said end faces of said valve member for communicating fluid from said feed line to said connection unit when said valve member is in said open position.

6. A device according to claim 5 wherein said means for rotating said valve member comprises means for biasing said rotary valve member into a closed position, first magnetic means joined to said valve member, swing arm means on said connection unit having second magnetic means thereon, means for moving said swing arm means toward said first magnetic means into a position in which said second magnetic means acts upon said first magnetic means to cause rotation of said valve member into said open position, and means for moving said swing arm means away from said first magnetic means to allow said valve member to rotate into said closed position.

7. A device according to claim 5 wherein said means for rotating said valve member comprises groove means formed in the outer circumferential surface of said valve member, and pin means on said connection unit for engaging said groove means in response to movement of said connection unit along said feed line, said groove means extending lengthwise of and at least partially oblique to the axis of rotation of said valve member, for converting axial movement of said connection unit along said feed line into rotary movement of said valve member.

8. A device for supplying a fluid under pressure from a feed line having a plurality of tap points to at least one user at a selected one of said tap points, the tap points being spaced apart over the length of the feed line, the device comprising at least one connection unit for connecting the user to the feed line movable along the feed line for the purpose of selecting a tap point, at least one tap valve at one of said tap points, said tap valve including a tubular valve member having a longitudinal axis approximately parallel with the longitudinal extent of said feed line and being disposed within said feed line, said valve member being movable between open and closed positions to control communication of fluid between said feed line and said connection unit, said tubular valve member being open-ended to allow fluid communication therethrough when said valve member is in both said closed and open positions, means for moving said valve member between said closed and open positions in response to axial movement of said connection unit along said feed line into a connecting position corresponding to said one tap point, sealing means between said connection unit and said tap valve for providing a seal therebetween in response to the opening of said tap valve, said valve member having opposite end faces exposed in any operating position to one and the same fluid pressure, said tubular valve member having an opening through the wall thereof intermediate said end faces of said valve member for communicating fluid from said feed line to said connection unit when said valve member is in said open position.

9. A device according to one of claims 5 or 8, comprising a rotary valve member having its axis of rotation at least approximately parallel with the lengthwise direction of the feed line and disposed so as to become actively connected with a swinging actuating member on said connection unit upon positioning said connection unit at said tap point so as to rotate said valve member into its open position.

10. A device according to one of claims 1, 5 or 8, comprising spring means for biasing said tap valve into its closed position.

* * * * *